UNITED STATES PATENT OFFICE.

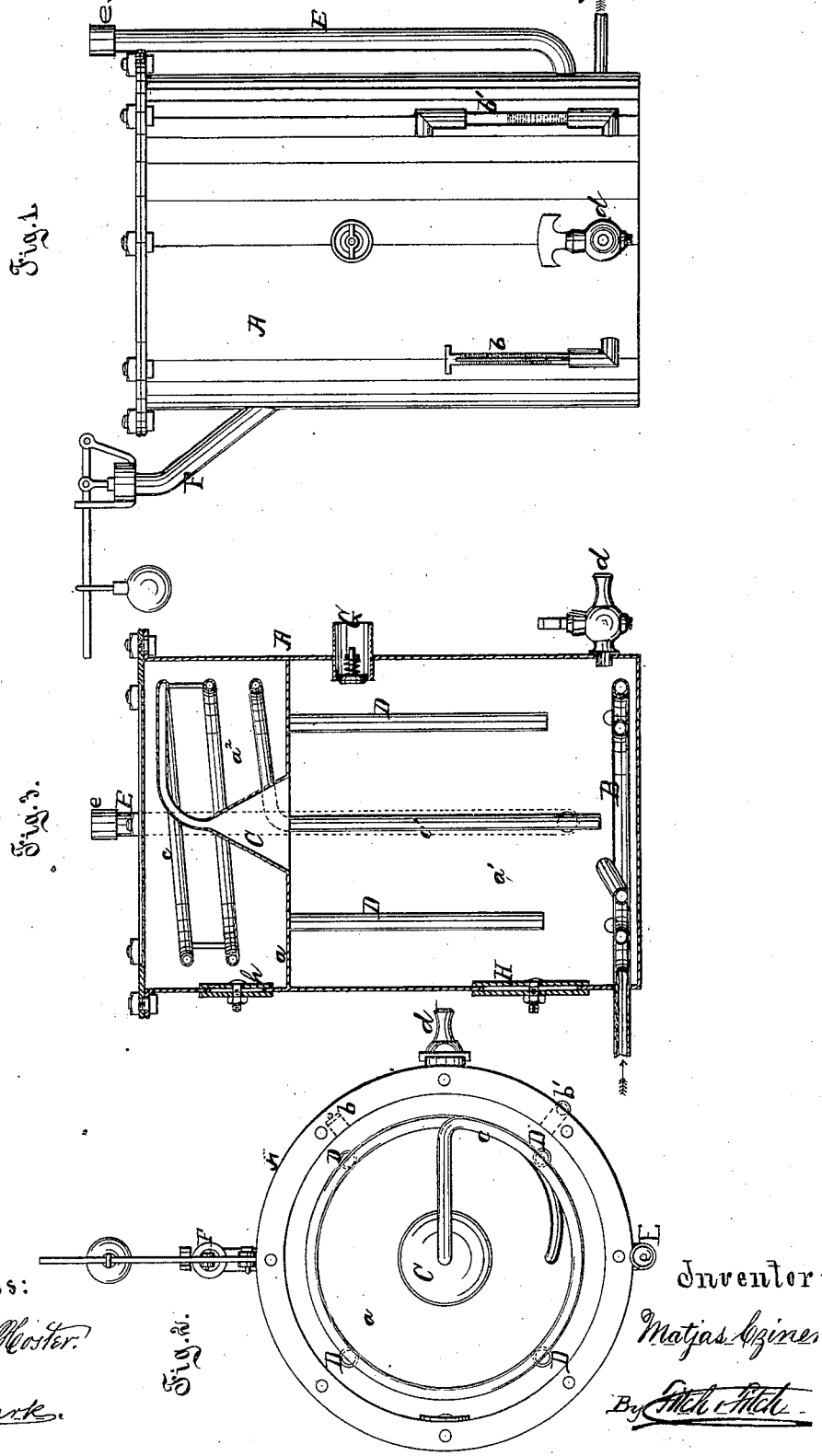

MATJAS CZINER, OF NEW YORK, N. Y., ASSIGNOR OF PART OF HIS RIGHT TO JAMES BARKER AND SAMUEL LEVY, OF SAME PLACE.

IMPROVEMENT IN APPARATUS FOR MASHING.

Specification forming part of Letters Patent No. 205,730, dated July 9, 1878; application filed August 4, 1877.

CASE B.

*To all whom it may concern:*

Be it known that I, MATJAS CZINER, of the city, county, and State of New York, am the inventor of an Improved Apparatus for Treating Corn Mash with Heat for the Production of Wort, of which the following is a full, clear, and exact description, reference being had to the accompanying drawings, forming part of this specification.

My invention consists in an apparatus for treating corn mash to heat, composed of a closed vessel, divided into an upper and a lower or heating chamber, a condensing-coil, opening at one end from the upper wall of the lower chamber and at the other end into the lower chamber, near the bottom thereof, by means of a depending pipe, as described, and a series of pipes or tubes extending from near the bottom of the lower chamber to and opening through the upper wall thereof into the upper chamber, all arranged to operate as described.

Figure 1 is an elevation. Fig. 2 is a plan with the top removed, and Fig. 3 is a vertical central sectional view of the improved apparatus embodying my invention.

A is a closed vessel. In the upper part of the vessel, at $a$, is a partition, which divides the vessel into two chambers, $a^1$ and $a^2$, the lower chamber, $a^1$, constituting the mash-chamber.

At E is an entrance-pipe or conduit, leading into the chamber $a^1$, at or near the bottom thereof, through which the mash is introduced into the vessel. This pipe should be adapted to be closed at its outer end by a cap or valve, as at $e$. From a central opening in the partition $a$ there rises the inverted funnel C, which is continued from its open apex into the coil of pipe $c$ in the upper chamber, $a^2$, and at the extremity of the coil is the pipe $c'$, which descends through the partition $a$ into the chamber $a^1$, to near the bottom thereof.

At D are shown pipes, which extend from near the bottom of the chamber $a^1$ up to the partition $a$, and open thence into the chamber $a^2$. At $d$ is shown a cock or vent, through which the mash, after heating, is withdrawn from the vessel, the said cock being placed near the bottom of the vessel, as shown.

At F is shown a safety-valve, by which the pressure to be permitted in the vessel may be regulated.

At G is an air-valve, which permits the entrance of air into the vessel whenever a tendency to a vacuum in the lower chamber, $a^1$, is caused by the return into said chamber of the products of the boiling at a less temperature and tension than on leaving said chamber, and thus preventing a collapse of the vessel by the outside atmospheric pressure. The said valve is so constructed as to prevent the escape through it of any gases, vapors, or other matter evolved by the heating of the mash.

At H is shown a man-hole admitting to the chamber $a^1$, and at $h$ a man-hole admitting to the chamber $a^2$, said holes being suitably closed.

At B is a steam-coil, by which heat may be conveniently given to the mash in the chamber $a^1$. At $b$ is a thermometer, by means of which the temperature or degree of heat of the mash may be readily perceived by the operator. At $b'$ is a glass gage, which indicates the depth or amount of mash present in the vessel.

The operation of my apparatus is as follows: Corn mash is introduced into the chamber $a^1$, through the pipe E, until the said chamber is about one-third filled—that is to say, until the ends of the pipes D and $c'$ are amply immersed in the mash. The pipe E is then closed at $e$. Heat is now applied, which may be conveniently done by means of the coil B. As the temperature of the mash is gradually raised the vapors of the spirit in the mash are given off, and, rising into the coil $c$, are there partially or entirely condensed, the said coil being cooler than the chamber $a^1$, as it is arranged in the chamber $a^2$, which is not heated. This continues until the temperature of the mash rises to 212° Fahrenheit, or the boiling temperature, when the mash begins to boil in the lower chamber, and by the pressure thereby exerted in the said chamber is caused to ascend through the tubes D into the upper chamber. The entrance of the boiling mash into the upper chamber, of course, rapidly heats the coil c therein, and checks the condensation of the vapors in said coil. Until such time as the mash boils, and is thus driven up into the upper chamber, the coil being cool in comparison with the temperature of the lower chamber, the upper chamber being not subjected to heat, the vapors of spirit given off by the mash and ascending into the coil are there partially or wholly condensed, and flow back into the mash through the pipe $c^1$. When the mash begins to boil, this operation ceases, and the dissolving and disintegrating of the mash are accomplished by its being driven violently into the upper chamber through the pipes D. When the mash reaches a temperature of 220° Fahrenheit it is relieved from the further action of the heat by cutting off steam from the coil B. Thereupon the entire mash, and all the products of its partial distillation and immediately subsequent boiling and agitation, will fall into the lower chamber, from which it may be drawn off, cooled, clarified, and prepared for use.

I am thus enabled by my apparatus to produce a thoroughly dissolved and disintegrated mash, which retains in a liquid form all the spirit or alcohol contained in its ingredients.

It is not my intention to herein claim the peculiar process I employ of treating corn mash to heat which I have mentioned, as I intend to make such process the subject-matter of a separate application for Letters Patent; but I desire to claim only hereunder the mechanical apparatus by which the process may be successfully carried out.

What I claim, therefore, as my invention, and desire to secure by Letters Patent, is—

1. In an apparatus for treating corn mash to heat, the closed vessel A, having partition $a$, dividing it into an upper chamber, $a^2$, and lower or heating chamber, $a^1$, together with the tubes D, extending from near the bottom of said lower chamber to said partition, and thence opening into said upper chamber, as and for the purpose specified.

2. In an apparatus for treating corn mash to heat, the combination, in a closed vessel, A, having the chambers $a^1$ and $a^2$, of the coil $c$ in the upper chamber, having the funnel C in the lower chamber, and the depending pipe $c'$, together with the tubes D, as described, all arranged to operate as and for the purpose specified.

3. In combination, the closed vessel A, having partition $a$, funnel C, coil $c$, pipe $c'$, and pipes D, the entrance-conduit E, the cock $d$, and valves F and G, together with suitable heating-coil B, all arranged as described, and to operate as set forth.

MATJAS CZINER.

Witnesses:
 B. S. CLARK,
 A. S. FITCH.